US008141161B2

(12) United States Patent
Kuroki

(10) Patent No.: US 8,141,161 B2
(45) Date of Patent: Mar. 20, 2012

(54) SYSTEM AND METHOD FOR MANAGING TRACE OF CERTIFICATIONS

(75) Inventor: Akihiko Kuroki, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 944 days.

(21) Appl. No.: 11/748,127

(22) Filed: May 14, 2007

(65) Prior Publication Data

US 2007/0266237 A1 Nov. 15, 2007

(30) Foreign Application Priority Data

| May 12, 2006 | (JP) | 2006-134412 |
| May 12, 2006 | (JP) | 2006-134413 |
| May 12, 2006 | (JP) | 2006-134414 |
| May 12, 2006 | (JP) | 2006-134423 |

(51) Int. Cl.
*G06F 17/40* (2006.01)
*G06K 15/02* (2006.01)
(52) U.S. Cl. .......... 726/26; 358/1.14; 358/1.15
(58) Field of Classification Search ...... 726/1; 358/1.14
See application file for complete search history.

(56) References Cited

U.S. PATENT DOCUMENTS

| 6,650,794 | B1 * | 11/2003 | Aoki | 382/306 |
| 6,952,726 | B1 * | 10/2005 | White et al. | 709/224 |
| 2002/0198745 | A1 * | 12/2002 | Scheinuk et al. | 705/4 |
| 2004/0012807 | A1 * | 1/2004 | Konishi | 358/1.15 |
| 2004/0233472 | A1 * | 11/2004 | Gassho et al. | 358/1.15 |
| 2005/0190408 | A1 * | 9/2005 | Vittitoe | 358/3.06 |

FOREIGN PATENT DOCUMENTS

| JP | 10320147 | 12/1998 |
| JP | 2002189638 | 7/2002 |

* cited by examiner

*Primary Examiner* — Kambiz Zand
*Assistant Examiner* — Imhotep Durham
(74) *Attorney, Agent, or Firm* — Browdy and Neimark, PLLC

(57) ABSTRACT

A certificate server 10, in response to a request from a client 131, extracts certificate data from a certificate database 102 to create a certificate file including print-job log data, and transmit the file to the client 131. The client 131 extracts the print-job log data, creates certificate print data based on the file to transmit the data to a printer 141. The printer 141 prints contents of the received data on paper every page, confirms the completion of a discharge of a printed sheet for each page to transmit a certificate ID code, its page number, an IP address of the printer, the time and date of receiving completion of a discharge, a certificate ID, a paper tray number, and a paper type as a discharge log data to the client 131. The client 131 transmits the received print-job log data and discharge-log data to a log server 15.

18 Claims, 11 Drawing Sheets

FIG. 3A  PRINT-JOB LOG

| TIME AND DATE OF CERTIFICATE FL CREATION | CODE OF HANDLER | CERTIFICATE ID | TYPE OF CERTIFICATE | CERTIFICATE SERIAL NUMBER | CODE FOR CERTIFICATE RECORD MNGMNT NECESSITY | TOTAL PAGE NUMBER |
|---|---|---|---|---|---|---|
| 20020707090000 | E000001 | PC012000207070900000043XRT3 | RECEIPT 2 | A223456-7890 | 2 | 1 |
| 20020707101501 | E000001 | PC012000207071015 1223XRT1 | RECEIPT 1 | A223456-7892 | 2 | 1 |

FIG. 3B  DISCHARGE COMPLETION LOG

| IP OF SENDING PRINTER | TIME AND DATE OF RECEIVING DISCHARGE LOG | CERTIFICATE ID | DISCHARGED PAGE NUMBER | SHEET SUPPLYING TRAY NUMBER | PAPER TYPE |
|---|---|---|---|---|---|
| 10.14.7.19 | 20020707090015 | PC012000207070900000043XRT3 | 1 | TRAY 1 | PLANE |
| 10.14.7.19 | 20020707090020 | PC012000207071015 1223XRT3 | 1 | TRAY 1 | PLANE |

FIG.7

PRINTOUT COMPLETION LOG

20020707090010 Printer IP=10.14.7.19
JOB START NAME=PC01200207090000023XRT1

20020707090012 Printer IP=10.14.7.19
PC01200207090000023XRT1:PAGE1
PC01200207090000023XRT1:INPUT = TRAY 1
PC01200207090000023XRT1:MEDIA = PLANE 20020707090017 Printer IP=10.14.7.19
PC01200207090000023XRT1:PAGE1
JOB END NAME=PC01200207090000023XRT1

20020707090012 Printer IP=10.14.7.19
JOB START NAME=PC01200207090000033XRT2

20020707090014 Printer IP=10.14.7.19
PC01200207090000033XRT2:PAGE1
PC01200207090000033XRT2:INPUT = TRAY 1
PC01200207090000033XRT2:MEDIA = PLANE 20020707090022 Printer IP=10.14.7.19
PC01200207090000033XRT2:PAGE1
JOB END NAME=PC01200207090000033XRT2

PRINTOUT COMPLETION LOG

20020707090010  Printer IP=10.14.7.19
               JOB START NAME=PC01200207090000023XRT1

20020707090012  Printer IP=10.14.7.19
               PC01200207090000023XRT1: PAGE1
               PC01200207090000023XRT1: INPUT = TRAY 1
               PC01200207090000023XRT1: MEDIA = PLANE 20020707090115  Printer IP=10.14.7.19
               JOB START NAME=PC01200207090000023XRT1

20020707090117  Printer IP=10.14.7.19
               PC01200207090000023XRT1: PAGE1
               PC01200207090000023XRT1: INPUT = TRAY 1
               PC01200207090000023XRT1: MEDIA = PLANE 20020707090122  Printer IP=10.14.7.19
               JOB END NAME=PC01200207090000023XRT1

20020707090117  Printer IP=10.14.7.19
               JOB START NAME=PC01200207090000033XRT2

20020707090120  Printer IP=10.14.7.19
               PC01200207090000033XRT2: PAGE1
               PC01200207090000033XRT2: INPUT = TRAY 1
               PC01200207090000033XRT2: MEDIA = PLANE 20020707090125  Printer IP=10.14.7.19
               PC01200207090000033XRT2: PAGE1
               JOB END NAME=PC01200207090000033XRT2

PRINTOUT COMPLETION LOG

20020707090010  Printer IP=10.14.7.19
JOB START NAME=PC01200207090000023XRT1

20020707090013  Printer IP=10.14.7.19
PC01200207090000023XRT1:PAGE1
PC01200207090000023XRT1:INPUT = TRAY 1
PC01200207090000023XRT1:MEDIA = PLANE 20020707090018  Printer IP=10.14.7.19
PC01200207090000023XRT1: PAGE1
JOB END NAME=PC01200207090000023XRT1

20020707090013  Printer IP=10.14.7.19
JOB START NAME=PC01200207090000033XRT2

FIG.10A

CODE OF HANDLER : E000001

DATE OF PRINTING : DATE [7] MONTH [JULY]

[EXECUTE]

FIG.10B

CODE OF HANDLER : E000001
TIME AND DATE OF OUTPUT (10:15AM, 8TH, JULY)

- OUTPUTTED CERTIFICATE -

DATE OF CERTIFICATE ISSUANCE TRACE : 7TH, JULY, 2002

| TIME | VOUCHER NUMBER | TYPE OF CERTIFICATE | DISCH-ARGE |
|---|---|---|---|
| 9:00 | A123456-7890 | RECEIPT 2 | ○ |
| 10:15 | D1234567890123456 | RECEIPT 1 | ○ |
| 19:15 | C1234567890123456 | RECEIPT 2 | × |
|  |  | RECEIPT 1 | ○ |
|  | END OF LIST | - | - |

[PREV] [NEXT]  PAGE 1/1

[FINISH] [BACK] [EXE PRINT]

SYSTEM AND METHOD FOR MANAGING TRACE OF CERTIFICATIONS

CROSS-REFERENCE TO RELATED APPLICATIONS

This application is based upon and claims the benefit of priority from the prior Japanese Patent Application No. from 2006-134412 to 2006-134414 and 2006-134423, filed on May 12, 2006, the entire contents of which are incorporated herein by reference.

FIELD OF THE INVENTION

The present invention generally relates to an apparatus, a system, and a method for managing trace of issuing certificates by image forming apparatus equipped with a printing function, such as a printer or a multifunction device, and more specifically to a system for managing trace of issuing certificates, wherein a certificate server having a certificate database, a log server, and a client are interconnected via communication medium to constitute a network and an image forming apparatus is connected to the client directly or via the network; a method thereof; an apparatus for managing trace of issuing certificates, used in the system; and an image forming apparatus for use in the system.

BACKGROUND OF THE INVENTION

Receipts, for example, are important documents in terms of accounting, and thus it is necessary to be able to confirm each piece of information such as when each of receipts was printed, whether the receipt was actually printed, and whether the receipt was validly printed.

In an insurance office, for example, numerous receipts are issued to policyholders. A high-speed printer is utilized for the issuance of receipts, and thus it is necessary to be able to confirm which bitmap data stored in a buffering memory of a print engine has been printed.

In a host computer and a printer, an SNMP manager and an SNMP agent are equipped respectively, enabling a trap-notifying function from the SNMP client to the SNMP manager in response to detection of an error such as no paper, insufficiency of toner, or power-off.

However, since a coverable region of the SNMP client is a section relating to hardware of the printer, the SNMP client cannot keep track of whether which page of which job has been actually printed or not.

J.P. No. 2002-189638-A discloses a configuration in which log is registered directly onto a log managing server from a printer, and a plurality of the registered log such as the number of printed pages, scanned times, and communication time are managed by the unit of a printer, a user, or both of them grouped.

Additionally, J.P. No. 10-320147-A, referred as document 2 hereinafter, discloses a configuration in which completion of a job is detected when a print-out event occurs in a printer 4 and information of the job completion is transmitted to a print-demanding host on job completion.

However, neither of the above-mentioned documents discloses a way to collect the logs for which of the pages of a job has been actually printed, thus neither is practical because managing trace of issuing important certificates in detail may fail even if these inventions are applied for managing trace of issuing certificates.

Besides, neither of the above-mentioned documents discloses a way to collect the logs regarding the contents of a file of the job, thus managing trace of issuing certificates cannot be efficiently performed even if these inventions are applied.

Moreover, the document 2 performs transmission of information of job completion to a print-demand host instead of to a log server; this aspect also limits the utilization of log.

Furthermore, although the document 2 does not mention at which of a control board or a print engine board logs are kept, since the print engine board is specifically for a print engine, it is reasonable to consider that a paper-discharge sensor is connected to the control board from which the print engine board receives data, and the logs of completion of paper-discharge are kept on the control-board side. In a case where memory devices are located also on the print engine board for high-speed printing and bitmap data for printing plural pages are temporarily stored thereon, merely detecting a discharge on the control-board side does not hold information of which pages have been printed; therefore, such a printer cannot be applied for an accurate system for managing trace of issuing certificates.

SUMMARY OF THE INVENTION

Accordingly, it is an object of the present invention to provide a system and method for managing trace of issuing certificates that is capable of efficiently managing the trace in more detail.

Another object of the present invention is to provide an image forming apparatus that is applicable for a system for accurately managing trace of issuing certificates.

In a first aspect of the present invention, there is provided a system for managing trace of issuing certificates by an image forming apparatus, comprising: a certificate server having a certificate database; a log server having first log storage means; and a client. These are interconnected via a communication medium to constitute a network, and the image forming apparatus is coupled to the client directly or via the communication medium. The certificate server, in response to a request that specifies selection conditions from the client, extracts certificate data that satisfies the conditions from the certificate database, creates a certificate file that includes data relating to the extracted data and print job, and transmits the certificate file to the client. The client extracts print-job log data from the received certificate file, and creates certificate print data based on the certificate file to transmit to the printer, wherein the print-job log data includes a certificate ID code, wherein the certificate print data includes data not to be printed that has the certificate ID code and a page number of each page. The printer prints contents of the received certificate print data on paper every page, confirms completion of discharge of a printed sheet every page, and thereafter transmits a discharge log data relating to the discharge and including the certificate ID code and its page number to the client. The client further transmits the received print-job log data and the discharge-log data to the log server. The log server stores the received print-job log data and the discharge-log data in the first log storage means, and in response to a search request for the contents of the first log storage means, outputs a result thereof. This aspect has an advantage in that efficiently managing the trace of issuing certificates is performed in more detail.

In a second aspect of the present invention, there is provided an apparatus for managing trace of issuing certificates, wherein a print-job log data is extracted from a certificate file that includes plural entries of print-job log data relating to the print job. The job-log data includes a certificate ID. Contents of the certificate file is converted into print data and provided to an image forming apparatus. The image forming apparatus confirms a discharge of a sheet of paper. Discharge-log data provided from the printer is received. The discharge-log data is data relating to each discharged sheet of paper and includes data of the certificate ID and page number. The job-log data and the discharge-log data are stored in storage means as certificate trace log data. This aspect has an advantage in that efficiently managing the trace of issuing certificates is performed in more detail.

In a third aspect of the present invention, there is provided an image forming apparatus comprising: storage means; raster image processing means; a print engine; a sheet-supplying tray; a paper conveying mechanism; a discharge sensor for detecting a paper discharged by the paper conveying mechanism; and a controlling means for performing a first process which, after temporarily storing received print data into the storage means, provides data to be printed that is included in the received print data to the raster image processing means every page to transform bitmap data, and a second process which, after temporarily storing the bitmap data in the storage means, provides the bitmap data every page to the print engine to form an image onto a sheet, wherein the print data includes data of a certificate ID and a page number as administrative data, wherein the controlling means further performs: a third process which, in response to a completion of the bitmap conversion by one page, sends out the page number together with a corresponding certificate ID; and a fourth process which, every time a discharge of a sheet is detected by the discharge sensor, sends out a certificate ID and a page number corresponding to the sheet. This aspect has an advantage in that by applying such an image forming apparatus to the system for managing the trace of issuing certificates, the management is performed in more detail.

In a forth aspect of the present invention, an image forming apparatus sends out data of a corresponding certificate ID and page number every time a discharge of a sheet of paper is detected by a paper-discharge sensor, allowing this image forming apparatus to be applicable to a system for more accurate management of trace of issuing certificates.

Other aspects, objects, and the advantages of the present invention will become apparent from the following detailed description taken in connection with the accompanying drawings.

BRIEF DESCRIPTION OF THE DRAWINGS

FIGS. 3A and 3B are illustrations of a print-job log table and a discharge-completion log table, respectively;

FIG. 7 is an illustration showing a discharge log provided to a discharge-log collecting component from a network printer in a case where two sheets of receipts are properly outputted from the network printer;

FIG. 8 is an illustration showing a discharge log in a case where a power of a network printer is turned on after being turned off during the transmission of print data from a client to the network printer;

FIG. 9 is an illustration showing a discharge log in a case where a power of a network printer is turned off before a discharge of a last page of a job is completed from a network printer but after completing transmission of print data from a client to the network printer;

FIG. 10A is an illustration showing an input display of conditions for selection when performing a log search, and FIG. 10B is an illustration showing a display of a search result.

DESCRIPTION OF THE PREFERRED EMBODIMENT

Figure 1:
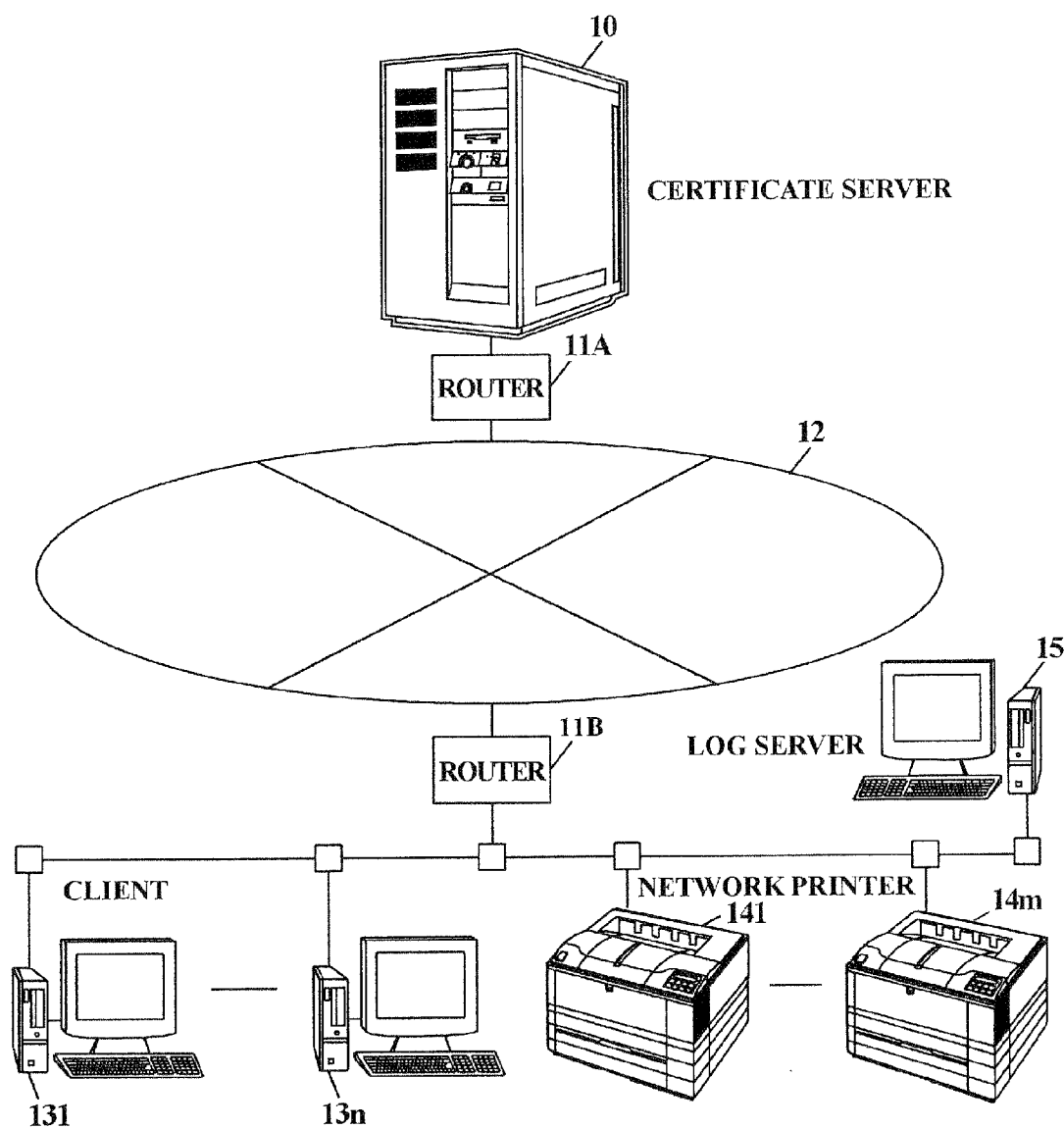
FIG. 1 is an illustration of a system for managing trace of issuing certificates of an embodiment according to the present invention.

Referring now to the drawings, wherein like reference characters designate like or corresponding parts throughout several views, a preferred embodiment of the present invention will be described below.

FIG. 1 is an illustration of a system for managing trace of issuing certificates of an embodiment according to the present invention.

A certificate server 10 is located in, for example, headquarters of an insurance company, and is connected to an internet 12 via a router 11A. On the other hand, in branch offices of the insurance company, clients 131 to 13n as apparatus for managing trace of issuing certificates (wherein n represents the number of the clients), network printers 141 to 14m (wherein m represents the number of the network printers), and a log server 15 are interconnected via a communication medium to constitute a LAN, wherein this LAN is connected to the internet 12 via a router 11B. In FIG. 1, only one branch office is illustrated for the sake of simplification.

Figure 2:
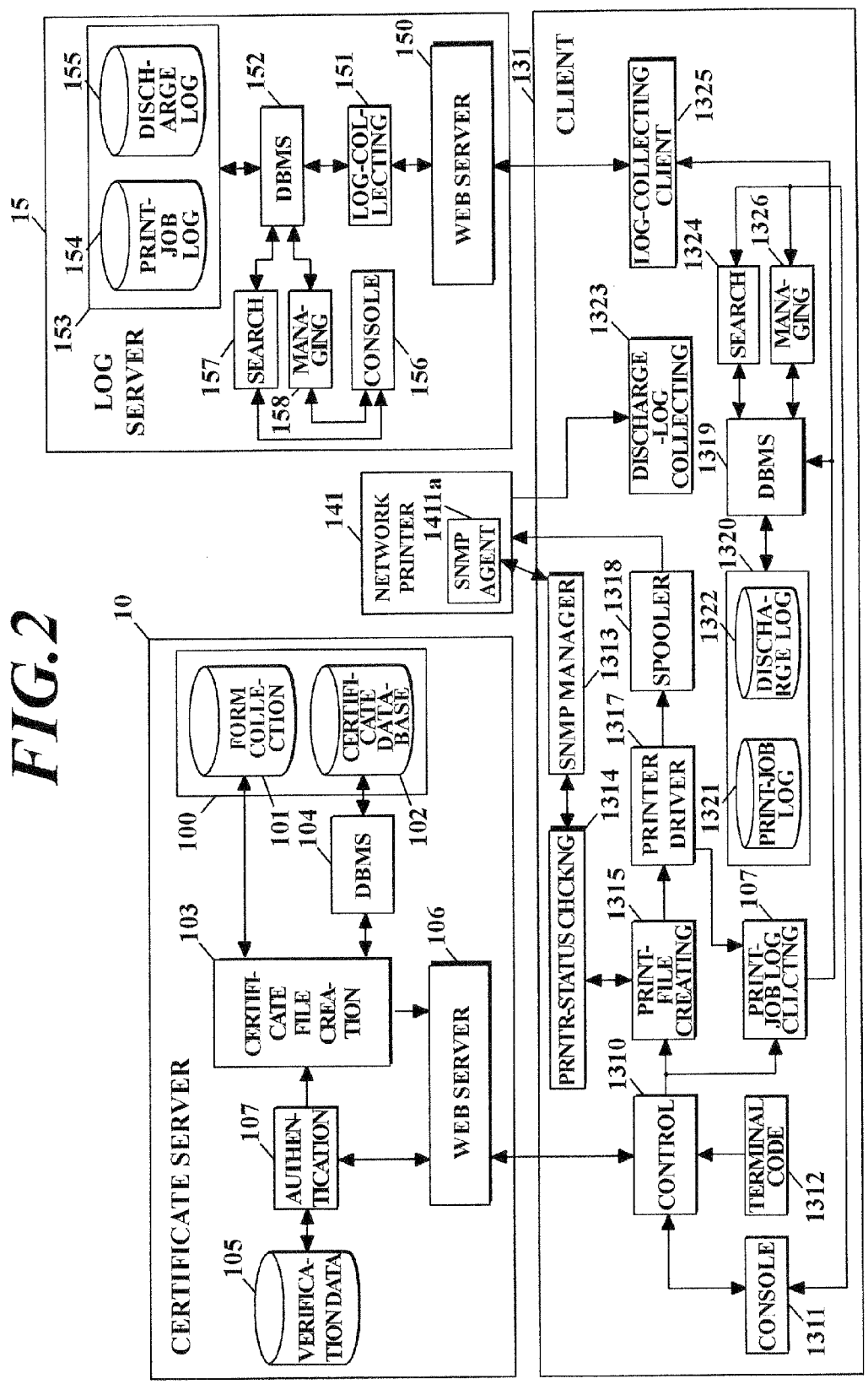
FIG. 2 is a functional block diagram in which a plurality of clients and a plurality of network printers are represented by one of them, respectively in the system for managing trace of issuing certificates in FIG. 1.

FIG. 2 is a functional block diagram in which the clients 131 to 13n and the network printers 141 to 14m are represented by the client 131 and the network printer 141, respectively, in the system for managing trace of issuing certificates in FIG. 1.

In the certificate server 10, a form collection 101 and a certificate database 102 are stored in a hard disk drive 100 (HDD 100). In the form collection 101, form data of various certificates are stored. On the other hand, in the certificate database 102, data of each insurance policyholder and related management are stored. A part of this management data is utilized as print-job log which is further described hereinafter, and includes a code of policy-handler, a type of certificate, a serial certificate number, and a necessity code indicating necessity/no necessity of trace management of issuing certificates.

This serial certificate number does not have to be unique throughout all certificates. The necessity code is only for keeping the certificate logs whose management is required.

A certificate file creating component 103 searches the certificate database 102 via a DBMS (database managing system) 104 based on selection conditions of certificate that a client requests, calls up a form from the form collection 101 depending on the type of certificate that a client requests, and writes the data of the search result, the time and date of the file creation and a certificate ID to create a certificate file. This data of the search result includes data to be printed and not-to-be printed of certificate, and the data not-to-be printed of certificate includes the above-mentioned data of print-job log.

The above-mentioned time and date of the file creation and certificate ID are the parts of the data of the print-job log as well.

A certificate ID can be represented as, for example, "PC012002070709000023XRT1", wherein a set of first four letters "PC01" is a terminal code of the client 131, a set of next sixteen letters "2002070709010823" is the time (09:01:08:23 ms) and date (7 Jul. 2002) of a file creation, and a set of next four letters "XRT1" is a identification sign of a certificate form. A terminal code of the client 131 is extracted from verification data 105 when authenticating the terminal.

On the other hand, in the verification data 105, terminals, IDs and passwords of users whose accesses are permitted among the clients 131 to 13m are registered. A Web server 106 provides a request from a client to an authentication component 107. Responding to this, if the request is for an authentication, the authentication component 107 determines whether the client and the user are registered or not by checking the verification data 105. If the result indicates that the client and the user are registered, the Web server 106 temporarily registers an IP address of its packet, and transmits a request for creating a certificate file that will be provided from the user afterwards to the certificate file creating component 103. The certificate file creating component 103 creates a certificate file as described above, and transmits the file to the user via the Web server 106.

In the client 131, a user manipulates an input device of a console 1311 to open a Web-browser and asks for an authentication page to the certificate server 10. After the page is shown in the Web-browser, the user manipulates the console 1311 to input a user ID and a password, and presses a "send" button. By this, data of a user ID, a password, and a terminal code 1312 are transmitted to the certificate server 10. The authentication component 107 performs authentication as mentioned above. If the authentication component 107 determines the user and the terminal to be legitimate, the authentication component 107 returns a search page for the certificate database 102 to a control component 1310 via the Web server 106. The user inputs conditions for selection and presses the "send" button.

By this series of actions, the conditions are provided to the certificate file creating component 103 via the Web server 106 and the authentication component 107. Following these steps described above, the certificate file creating component 103 creates a certificate file by extracting certificate data that satisfies the conditions and enter them into a form, and sends this file to the control component 1310 via the Web server 106. This certificate file is written in, for example, XML format, and thus printing requires conversion of the file into data that a printer driver 1317 can read.

Here, the network printer 141 is equipped with an SNMP agent 1411a that monitors status such as out of paper, toner, or power supply. In contrast, the client 131 is equipped with an SNMP manager 1313.

After receiving a certificate file, the control component 1310 provides a print-file creation component 1315 and a print-job-log keeping component 1316 with the certificate file. The print-file creation component 1315 responds to this and sends a request for a check to a printer-status checking component 1314. The printer-status checking component 1314 in turn responds to this by checking a printer status with the SNMP agent 1411a via the SNMP manager 1313. The SNMP agent 1411a in turn responds to this by providing the printer-status checking component 1314 via the SNMP manager 1313 with the printer status. The printer-status checking component 1314 reports the status to the print-file creating component 1315.

If the print-file creating component 1315 receives a report that indicates the printer status is normal, the print-file creating component 1315 converts contents of the certificate file into a data file that a printer driver 1317 can read, and provides the printer driver 1317 with the converted data file. The printer driver 1317 further converts this data file into a print data file written in the PDL (Page Description Language), and provides the network printer 141 via a spooler 1318 with the print data file. This print data file includes data that indicates a certificate ID and a paper type. The print data file further includes data of the number of pages of each certificate, which is afterwards provided for a print-log keeping component 1316 as a set of data of print-job log. A paper type is determined according to a form type; since a form type is included in a certificate ID, a paper type is determined based on the certificate ID.

The print-job-log keeping component 1316 extracts the data of print-job log mentioned above from a certificate file, adds a certificate ID and the number of pages to the data of print-job log as a part of it, and stores these data of print-job log into a print-job log table 1321 in an HDD 1320 via a DBMS 1319. FIG. 3A is an illustration of the print-job log table 1321.

Figure 4:
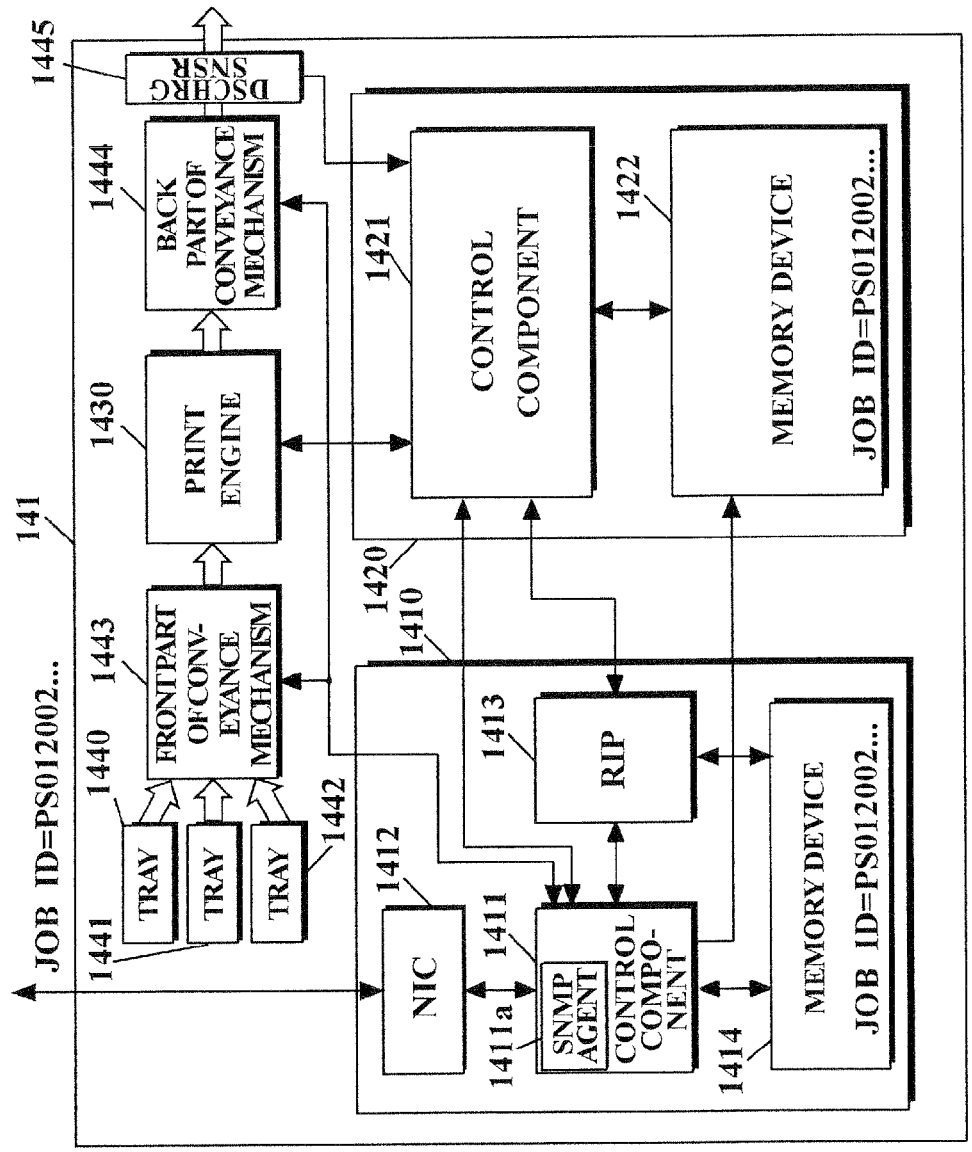
FIG. 4 is a block diagram of a printer relating to the embodiment.
Figure 5:
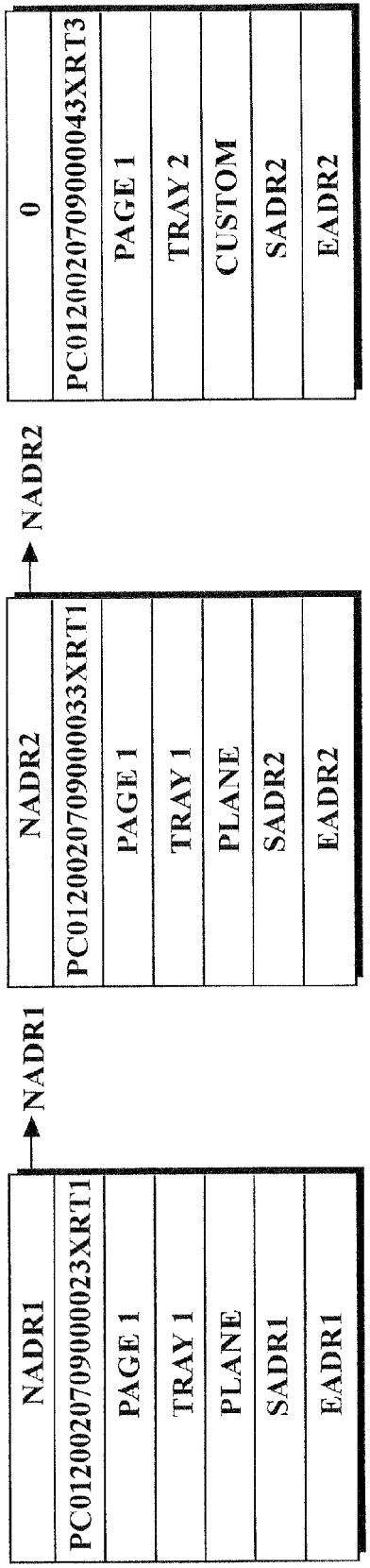
FIG. 5 is an illustration of a memory management list that is stored in a memory in FIG. 4.

FIG. 4 is a block diagram of a printer relating to the embodiment. FIG. 5 is an illustration of memory management lists stored in a memory device in FIG. 4. FIGS. 6A to 6F are time charts showing a process in a printer in FIG. 4.

In the network printer 141, a print engine 1430 is connected to a control board 1410 via a print engine board 1420.

In the control board 1410, a control component 1411 is equipped with a processor and a program ROM connected to this processor. In this program ROM, an OS, a control program and a program for the SNMP agent 1411a in FIG. 2 mentioned above are stored. The control component 1411 performs a control as described below by following this control program.

Before storing print data and bitmap data of one-page described below in a memory device 1414, the control component 1411 adds a management block onto a memory management list shown in FIG. 5, and sends a request for a memory allocation to the OS. A value is determined and written into the management block. This management block consists of a pointer that indicates the head address of a next management block (NADR1), a certificate ID (PC012002070709000023XRT1), its page number (Page1), a distinctive sign of a tray on which paper used for printing is located (Tray1), a type of paper used for printing (Plane), a starting address of storing the data of its page (SADR1), and an ending address of storing the data of its page. A value 0 of the pointer indicates that its management block is the last block of the list. This memory management is the same as in a print engine board 1420.

Figure 6:
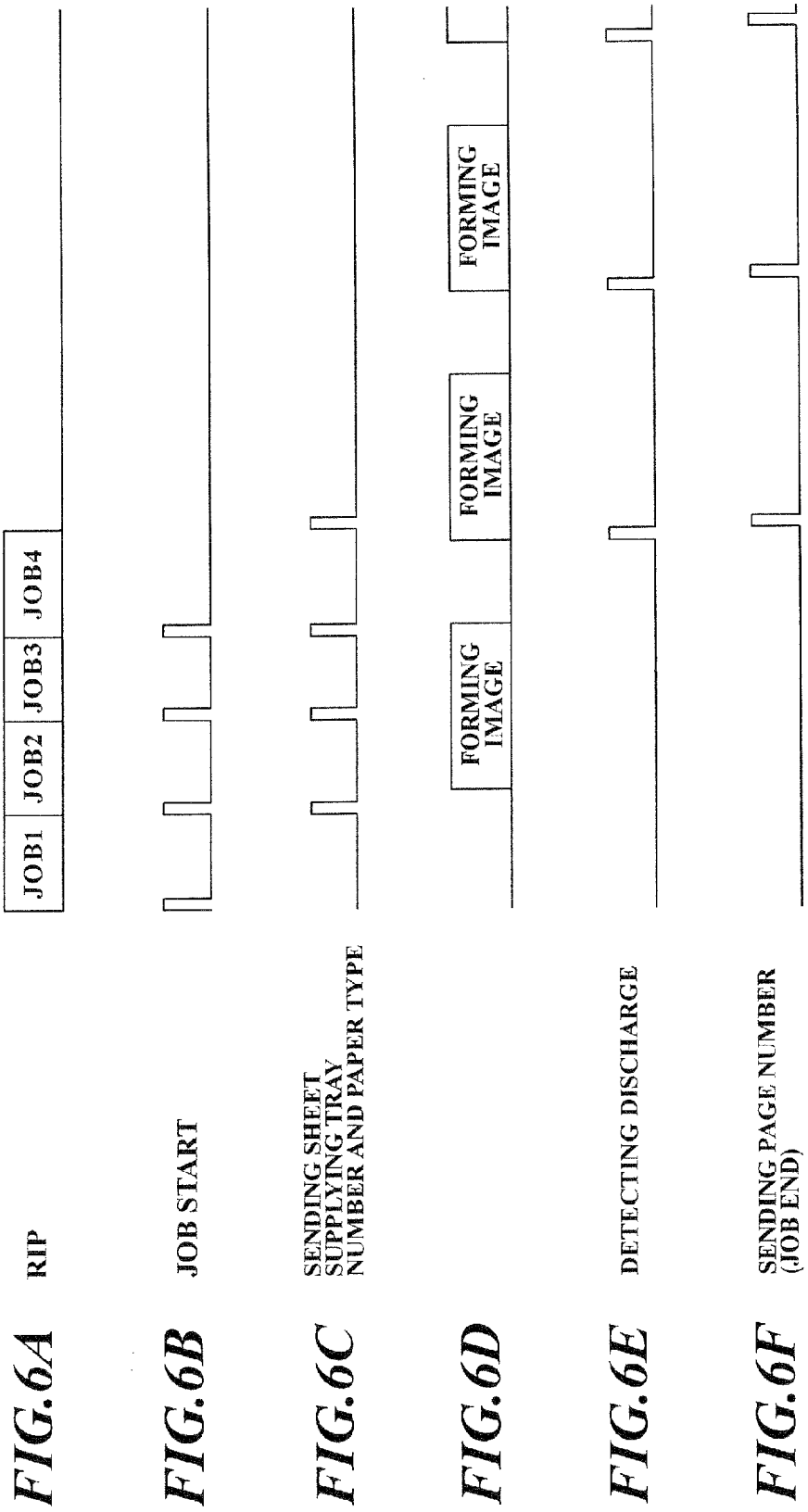
FIGS. 6A to 6F are time charts showing a process by the printer in FIG. 4.
Figure 11:
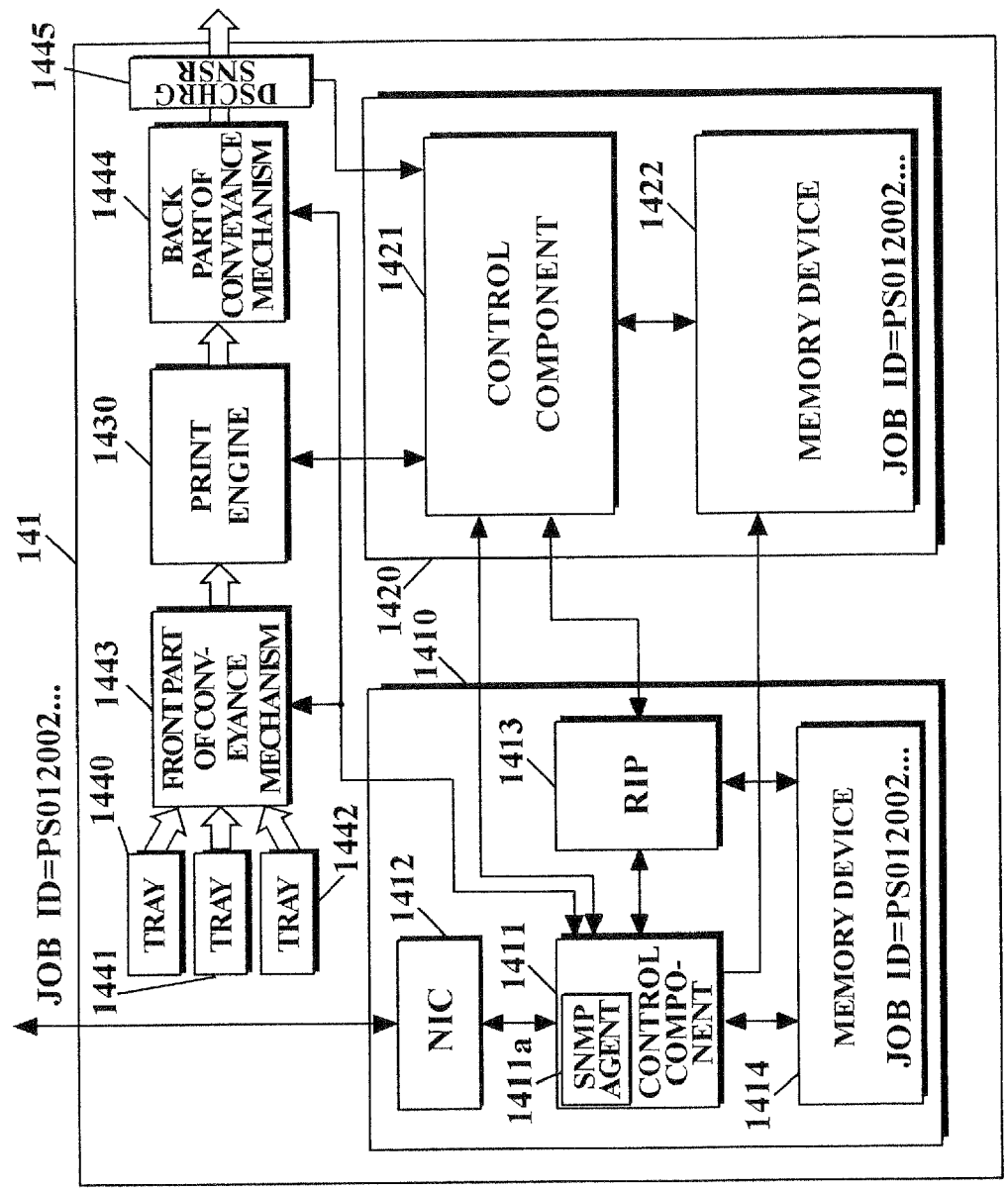
FIG. 11 is a block diagram of a printer showing a modification of FIG. 4

The control component 1411 stores print data provided from a network interface (NIC) 1412 in a DRAM of the memory device 1414, and sends a job start status data with a certificate ID to the client 131 (FIG. 6A). FIGS. 6A to 6F show a case where each of printers 1 to 4 prints one receipt.

The control component 1411 makes a RIP 1413 to perform a bitmap conversion of an image data included in print data, while simultaneously storing the print data into the memory device 1414 mentioned above, and temporarily stores its result in the memory device 1414 (FIG. 6B).

Here, the network printer 141 is equipped with plural sheet-supplying trays 1440 to 1442 and allows a user to determine a paper type and a size for each tray; this data is stored in an NVRAM of the memory device 1414. In this data, the data concerning which paper type to be used when a specified paper type does not exist in the network printer 141 is included. If a mode of selecting a sheet-supplying tray is in automatic, the control component 1411 determines a sheet-supplying tray to be used based on a paper type and a paper size that is included in the print data.

After completion of the bitmap conversion of an image data equivalent to one page, the control component 1411 refers to a list in FIG. 5 to send a tray number and a paper type together with a certificate ID as a part of discharge log data to the client 131 via the NIC 1412.

????The control component 1411 is equipped with a direct memory access controller (DMAC), which; provides a print engine board 1420 with the bitmap data temporarily stored in the memory device 1414 together with its management block data; erase the memory management block; and requests the OS to free the subject area.

The print engine board 1420 is equipped with a control component 1421 and a memory device 1422. The control component 1421 is equipped with a processor and a program ROM connected to this processor. In this ROM, an OS and a control program are stored, and the processor follows this control program to perform a control as described below.

????When storing the bitmap data equivalent to one page in a memory device 1422, the control component 1421 adds a management block onto a memory management list shown in FIG. 5, and requests the OS for a memory allocation.

The control component 1421 reads DMA-transmitted bitmap data by using an FIFO from the memory device 1422, adds a synchronization signal to create a video signal, and provides a print engine 1430 with the video signal. In the print engine 1430, a photoconductor drum is exposed to form an electrostatic latent image by this video signal, and developed with an electrified toner.

On the other hand, a front part of a sheet conveyance mechanism 1443 is controlled by a control component 1411 and a sheet of paper from a tray selected as described above is picked and provided to a transcribing component of the print engine 1430, where a toner image is transcribed onto the sheet. This sheet passes a transcribing component of the print engine 1430 and further conveyed at a back part of the sheet conveyance mechanism 1414. Image forming in FIG. 6D shows these exposure, development, and transcription.

The sheet of paper is further conveyed at the back part of the sheet conveyance mechanism 1414 and discharged onto a tray (not shown in a figure); an end part of the sheet is detected by a discharge sensor 1445 in this time (FIG. 6E).

If a sheet-end detecting signal (discharge completion signal) from the discharge sensor 1445 is activated after providing the print engine 1430 with data equivalent to one page, the control component 1421 acquires data of a certificate ID and a page number of this page from the memory management list mentioned above, sends this data to the control component 1411, requests the OS to free the subject area, and erase the memory management block. The control component 1411, in response to the sending described above, sends the data of a certificate ID and a page number as a part of data of a discharge log to the client 131 via the NIC 1412 (FIG. 6F)). In FIGS. 6A to 6F, since one job is equivalent to a one-page printing, an end-job status is also sent at this time. In FIG. 2, since the number of print pages is already notified by the print-file creating component 1315, the print-log-job keeping component 107 may determine an end of a sob when the page number received from the printer 141 agrees with the number of print pages. In this case, sending an end-job status mentioned above is unnecessary.

FIG. 7 shows discharge-log data provided from the network printer 141 to a discharge-log collecting component 1323, and the discharge log data that is added by the discharge-log collecting component 1323, in a case where two sheets of receipts are properly outputted from the network printer 141. In this figure, a number "20020707090010" indicates that the network printer 141 has received a job-start status from a control board 1410 at 09 hours 00 minutes 10 seconds on 7 Jul. 2002. "PC012002070709000023XRT1" is a certificate ID. "Input=Tray1", which is provided during an execution of a job, indicates that the job is using paper on the tray1, and "Media=Plane" indicates that the paper type is plane. The time and date "020020707090015" on a third row from the top indicates when a discharge-log collecting component received the job-start status from the control component 1421 via the control component 1411 in response to the above completion of discharging paper.

FIG. 8 shows a discharge log in a case where a power of the network printer 141 is turned on after being intermittently turned off during transmission of print data from the client 131 to the network printer 141. In this case, a line "JOB START NAME", instead of "JOB END NAME", appears about a first print page, indicating an occurrence of retransmission from the client 131 to the network printer 141.

FIG. 9 is an illustration showing a discharge log in a case where a power of the network printer 141 is turned off before a discharge of a last page of a job is completed from the network printer 141 but after completing transmission of print data from the client 131 to the network printer 141. In this case, the print data is extinguished without discharging a last page. Since transmission of the print data is completed from the printer driver 1317 to the network printer 141 via the spooler 1318, retransmission from the spooler 1318 will not occur.

Returning now to FIG. 2, the discharge-log collecting component 1323 stores the received data of discharge-log in the discharge-log table 1322 in the HDD 1320 via the DBMS 1319. FIG. 3B is an illustration of the discharge-log table (discharge-completion log table) 1322. A discharge log consists of an IP address of a sender included in a received packet (static IP address of printer), the time and date when the discharge-log collecting component 1323 receives a completion of a discharge from the network printer 141, a certificate ID, a page number of the discharged sheet, a sheet-supplying tray number, and a paper type.

The print-job log table 1321 and the discharge-log table 1322 constitute a relational database, having a certificate ID as a shared column. When a user manipulates the console 1311 to input selection conditions into a search component 1324 and provides a search request, the search component 1324 reads out specified data from the print-job log table 1321 and the discharge-log table 1322 via the DBMS 1319 based on the search request. This data is displayed on a display device of the console 1311 via the DBMS 1319 and the search component 1324.

On the other hand, a log-collecting client 1325 collects data of print-job log from the print-job-log keeping component 1316 and data of discharge-log from the discharge-log collecting component 1323, and sends these sets of data to the log server 15. The log-collecting client 1325 may wait until the log accumulates up to a specified number of records, and send this accumulated log to the log server 15.

In the log server 15, these sets of data are provided to a log-collecting component 151 via a web server 150, and the log-collecting component 151 adds these sets of data into a print-job log table 154 and a discharge-log table 155 in a HDD 153 via a DBMS 152. When a user manipulates a console 156 to input selection conditions into a search component 157 and provides a search request, the search component 157 reads specified data from the print-job log table 154 and the discharge-log table 155 via the DBMS 152 based on the search request. This data is displayed on a display device of the console 156 via the DBMS 152 and the search component 157.

FIG. 10A is an illustration showing a search-condition screen displayed on the console 156. In this example, a code of handler and date of printing are selection conditions. A search result, such one shown in FIG. 10B for example, is displayed after pressing an "Execute" button on the screen. A circle sign (O) in the discharge section in the figure indicates that the printed certificate has been discharged, and a cross sign (X) indicates that the printed certificate has not been discharged.

After a certain days specified by manipulating the console 156 have passed, a log-managing component 158 erases the past data that is older than the specified date stored in the print-job log table 154 and the discharge-log table 155 via the DBMS 152.

In the same way, a log-managing component 1326 erases past data that is older than the specific date stored in the HDD 1320 and print-job table 1321 via the DBMS 1319.

According to the embodiment, more detailed managing trace of issuing certificates can be performed efficiently with a following configuration; in the certificate server 10, certificate data that satisfies certain conditions is extracted from the certificate database 102 in response to a request from the client 131, and a certificate file that includes the extracted data (including a code of handler, a type of certificate, a serial number of certificate, a management code indicating the necessity of issuing certificates, and the number of pages of each certificate, used as data of print-job log) and the data relating to a print job (time and date of the certificate file creation and a certificate ID, used as data of print-job log) is created and transmitted to the client 131; on the client 131 side, the data of the print-job log is extracted, and certificate print data is created according to the certificate file and transmitted to the printer 141; the printer 141 prints contents of the received certificate print data onto papers page by page, and confirms a completion of a discharge of a printed sheet for each page, and transmits discharge-log data (an IP address of printer, the time and date of receiving a discharge completion, a certificate ID, the page number of the discharged sheet, sheet-supplying tray number, and a paper type) to the client 131; further on the client 131 side, the received data of print-job log and the discharge-log are transmitted to the log server 15, and these sets of log data correlated by a certificate ID are stored in the HDD 153 of the log server 15.

Moreover, before printing on a sheet of paper, the printer 141 sends data of the page number together with a certificate ID to the client 131 in response to a reception of print data; thus, trace of issuing certificates in the printer 141 can be traced step by step, or in detail.

Since data of print-job log includes a code of certificate handler, a relationship between a certificate handler and a certificate record can be known by checking merely the log; thus, managing trace of issuing certificates is performed even more efficiently.

In addition, data of print-job log includes the number of pages of one certificate; thus, managing trace of issuing certificates is performed in further detail by checking the relationship for the number of pages of one certificate.

Further, since data of print-job log includes the time and date of a certificate file creation, a certificate record can be known by checking a relationship with this time and date; thus, managing trace of issuing certificates is performed in further detail.

Furthermore, since discharge-log includes the time and date of reception of a discharge log as data relating to the time and date of a discharge of paper printed by the printer 141, a relationship can be known between the time and date of a creation of a certificate file and that of a discharge; thus, managing trace of issuing certificates is performed in further detail.

Besides, since data of discharge-log includes data of a paper type used for printing by the printer 141, a certificate record can be known by checking a relationship with this paper type; thus, managing trace of issuing certificates is performed in further detail.

Further, since data of discharge-log includes a number of sheet-supplying tray used by the printer 141, a certificate record can be known by checking a relationship with this tray number; thus, managing trace of issuing certificates is performed in further detail.

Furthermore, also on the client 131 side, data of print-job log and data of discharge-log are stored in the HDD 1320; thus, managing trace of issuing certificates can be performed solely by the client 131.

Although a preferred embodiment of the present invention has been described, it is to be understood that the invention is not limited thereto and that various changes and modifications may be made without departing from the spirit and scope of the invention.

For example, although the case where a certificate is a receipt has been described in the above embodiment, the certificate may be other certificates that prove facts or relations of rights, such as applications, bills, invoices, or checks. In addition, a printer may be a local printer that is connected to clients without using a network.

Moreover, a form collection 101 may be equipped with the client 103 instead of being equipped with the certificate server 10. Data relating to the time and date of creations of certificate files included in data of print-job log may be the time and date when the client 103 has received a certificate file from the certificate server 10. Data relating to the time and date of discharges of sheets printed by the printer 104 may be the time and date detected on the printer side. Data of a paper type or a sheet-supplying tray may be determined according to a certificate form and stored in the certificate database 102 where form types are stored.

In addition, as long as a serial number of certificate is unique, a certificate ID may be represented by, for example, an assembly of this number and the time and date of a certificate file creation or the time and date of a print-file creation.

Besides, it may also be acceptable that items of data to be logged are determined according to a type of certificate or a code indicating trace management of issuing certificates necessity (which is further categorized according to its level of importance in a case where management is necessary).

Furthermore, another acceptable configuration of the present invention is, as described in FIG. 10, where; a discharge-detection signal of the discharge sensor 1445 is provided to the control component 1411; after transmission of a video signal equivalent to one page from the control component 1421 to a print engine 1430 is completed, its certificate ID and page number are sent from the control component 1421 to the control component 1411; and in response to an activation of the discharge-detection signal after the process above, the control component 1411 outputs the certificate ID and page number via the NIC 1412, which in other words is a configuration where the front and back sides of a control component output the certificate ID and the page number of the completion of discharge.

What is claimed is:

1. A system for managing trace of issuing certificates by an image forming apparatus, comprising a certificate server having a certificate database, a log server having first log storage means, and a client are interconnected via a communication medium to constitute a network, and the image forming apparatus is coupled to the client,
wherein the certificate server comprises means for, in response to a request that specifies selection conditions from the client, extracting certificate data that satisfies the selection conditions from the certificate database, creating a certificate file that includes data relating to the extracted certificate data and print job and a certificate ID code having a client terminal identification code, and transmitting the certificate file to the client,
wherein the client comprises means for extracting print-job log data from the received certificate file, and for creating certificate print data based on the certificate file to transmit to the image forming apparatus, wherein the print-job log data includes the certificate ID code, wherein the certificate print data includes data not to be printed that has the certificate ID code and a page number of each page,
wherein the image forming apparatus comprises means for, in response to receiving the print data, transmitting data of its page number together with the certificate ID to the client before printing the print data, means for, in response to a completion of bitmap conversion from the print data by one page, transmitting data of its page number together with the certificate ID to the client, means for printing the bitmap data on paper every page, confirming completion of discharge of a printed sheet every page, and thereafter transmitting a discharge log data relating to the discharge and including the certificate ID code and its page number to the client,
wherein the client further comprises means for transmitting the received print-job log data and the discharge-log data to the log server,
wherein the log server comprises means for storing the received print-job log data and the discharge-log data in the first log storage means, and in response to a search request for the contents of the first log storage means, outputting a result thereof.

2. The system for managing trace of issuing certificates according to claim 1, wherein the print-job log data includes data of a handler of the certificate.

3. The system for managing trace of issuing certificates according to claim 1, wherein the print-job log data includes data of a total page number of one certificate to be printed.

4. The system for managing trace of issuing certificates according to claim 1, wherein the print-job log data includes data relating to a time at creation of the certificate file.

5. The system for managing trace of issuing certificates according to claim 1, wherein the discharge-log data includes data relating to a time at discharge of paper printed by the image forming apparatus.

6. The system for managing trace of issuing certificates according to claim 1, wherein the discharge-log data includes data of paper type used for printing by the image forming apparatus.

7. The system for managing trace of issuing certificates according to claim 1, wherein the discharge-log data includes data identifying a sheet-supplying tray used by the image forming apparatus.

8. The system for managing trace of issuing certificates according to claim 1, wherein the client further comprises: a second log storage means; and means for storing the extracted print-job log data and the received discharge-log data into the second log storage means.

9. A method of managing trace of issuing certificates by an image forming apparatus, wherein a certificate server having a certificate database, a log server having first log storage means, and a client are interconnected via a communication medium to constitute a network, and the image forming apparatus is coupled to the client, the method comprising:
the certificate server, in response to a request that specifies selection conditions from the client, extracting certificate data that satisfies the conditions from the certificate database, creating a certificate file that includes data relating to the extracted data and print job and a certificate ID code having a client terminal identification code, and transmitting the certificate file to the client;
the client extracting print-job log data from the received certificate file, and creating certificate print data based on the certificate file to transmit to the image forming apparatus, wherein the print-job log data includes the certificate ID code, wherein the certificate print data includes data not to be printed that has the certificate ID code and a page number of each page;
the image forming apparatus, in response to receiving the print data, transmitting data of its page number together with the certificate ID to the client before printing the print data, in response to a completion of bitmap conversion from the print data by one page, transmitting data of its page number together with the certificate ID to the client, printing the bitmap data on paper every page, confirming completion of discharge of a printed sheet every page, and thereafter transmitting a discharge log data relating to the discharge and including the certificate ID code and its page number to the client,
the client further transmitting the received print-job log data and the discharge-log data to the log server; and
the log server storing the received print-job log data and the discharge-log data in the first log storage means, and in response to a search request for the contents of the first log storage means, outputting a result thereof.

10. An apparatus for managing trace of issuing certificates by an image forming apparatus, comprising:
a processor; and
storage means, coupled to the processor, for storing a program and certificate files each of which contains print-job log data relating to a print job,
wherein the program orders the processor:
to extract print-job log data from a certificate file which includes plural items of print-job log data relating to a print job, the print job-log data having a certificate ID code, the certificate ID code having a client terminal identification code;
to convert contents of the certificate file into print data and to provide the converted contents to the image forming apparatus;
to receive data of a page number of the print data together with the certificate ID from the image forming apparatus after transmitting the print data by one page and before printing the print data, and after completion of bitmap conversion in the image forming apparatus, discharge-log data from the image forming apparatus after the image forming apparatus having confirmed that a printed paper had been discharged, the discharge-log data being data relating to each of discharged sheets and including data of the certificate ID and a page number thereof; and to store the job-log data and the discharge-log data in the storage means as a certificate issuance log data.

11. The apparatus for managing trace of issuing certificates according to claim 10, further comprising a network interface coupled to the processor,
wherein the program further orders the processor to receive the certificate file from a certificate server via the network interface and to store the certificate file in the storage means.

12. The apparatus for managing trace of issuing certificates according to claim 11, wherein the program further orders the processor to transmit the certificate issuance log data to a log server via the network interface.

13. An image forming apparatus comprising:
storage means;
raster image processing means;
a print engine;
a sheet-supplying tray;
a paper conveying mechanism;
a discharge sensor for detecting a paper discharged by the paper conveying mechanism; and
a controlling means for performing a first process which, after temporarily storing received print data into the storage means, provides data to be printed that is included in the received print data to the raster image processing means every page to transform bitmap data, and a second process which, after temporarily storing the bitmap data in the storage means, provides the bitmap data every page to the print engine to form an image onto a sheet,
wherein the print data includes data of a certificate ID code having a client terminal identification code and a page number as administrative data,
wherein the controlling means further performs:
a third process which, in response to a completion of the bitmap conversion by one page, sends out the page number together with a corresponding certificate ID; and
a fourth process which, every time a discharge of a sheet is detected by the discharge sensor, sends out a certificate ID and a page number corresponding to the sheet.

14. The image forming apparatus according to claim 13,
wherein the storage means comprises: a first memory which temporarily stores the received print data; and a second memory which temporarily stores the bitmap data,
wherein the controlling means comprises: a first controlling component which performs the first and third processes; and a second controlling component which performs the second process,
wherein the first memory is coupled to the first controlling component, the second memory is coupled to the second controlling component, and the discharge sensor is coupled to either the first or second controlling component,
the image forming apparatus further comprises a communication interface coupled to the first controlling component,
wherein the print data is provided to the first controlling component from outside via the communication interface,
wherein the fourth process is performed by the first and second controlling component in response to the detection.

15. The image forming apparatus according to claim 14, wherein the discharge sensor is coupled to the second controlling component,
wherein the third process comprises:
a process in which, every time a discharge of a sheet is detected, the second controlling component transmits data of a certificate ID and a page number corresponding to the sheet to the first controlling component; and
a process in which the first controlling component receives the data of the certificate ID and page number to transmit the data to outside.

16. The image forming apparatus according to claim 14, wherein the discharge sensor is coupled to the first controlling component,
wherein the third process comprises:
a process in which, after providing bitmap data by one page to the print engine, the second controlling component transmits data of a certificate ID and a page number corresponding to the page to the first controlling component; and
a process in which, after receiving the data of the certificate ID and the page number, the first controlling component transmits the data of the certificate ID and the page number to outside in response to the detection of a discharge of paper by the discharge sensor.

17. The image forming apparatus according to claim 14, wherein each of a plurality of the sheet-supplying trays has an ID,
wherein the first controlling component, in response to a completion of bitmap conversion by one page, further transmits an ID of a sheet-supplying tray used for printing the page together with a corresponding certificate ID to outside via the communication interface.

18. The image forming apparatus according to claim 14, wherein the first controlling component, in response to a completion of bitmap conversion by one page, further transmits data of a paper type used for printing the page together with a corresponding certificate ID to outside.

* * * * *